United States Patent [19]

Regan

[11] 4,161,394
[45] Jul. 17, 1979

[54] POLISHING SLURRY OF XANTHAN GUM AND A DISPERSING AGENT

[76] Inventor: Glen B. Regan, 17370 Skyline Blvd., Woodside, Calif. 94062

[21] Appl. No.: 916,925

[22] Filed: Jun. 19, 1978

[51] Int. Cl.$^2$ .............................................. C09K 3/14
[52] U.S. Cl. ................... 51/302; 51/284 R; 51/298; 106/5
[58] Field of Search ............... 51/283, 302, 303, 304, 51/305, 306, 307, 309, 300, 298, 284; 106/5, 3, 8

[56] References Cited

U.S. PATENT DOCUMENTS

| | | | |
|---|---|---|---|
| 3,413,252 | 11/1968 | Lima | 106/3 |
| 3,462,251 | 8/1969 | Whalen et al. | 51/301 |

*Primary Examiner*—Donald J. Arnold
*Attorney, Agent, or Firm*—Limbach, Limbach & Sutton

[57] ABSTRACT

A solution for use in suspending 0.05 to 15 micron ceria or alumina particles to produce a slurry for polishing lenses and semiconductor wafers is disclosed. The solution consists of water containing from 0.06 to 0.75 percent by weight of xanthan gum and from 0.5 to 5.0 percent by weight of a dispersing agent selected from the group consisting of the condensate of formaldehyde with naphthalene monosulfonic acid, polymethacrylic acid and their ammonium and alkali metal salts. The slurry is prepared by mixing one volume of the solution with about two volumes of water and then dispersing alumina, ceria, or zirconia particles in the resultant mixture. The quantity of ceria or alumina dispersed is in the range 10 to 20 percent by weight based on the combined weight of solution and added water.

4 Claims, No Drawings

POLISHING SLURRY OF XANTHAN GUM AND A DISPERSING AGENT

BACKGROUND OF THE INVENTION

Lenses, both glass and plastic, and semiconductor wafers are polished before use. Polishing is generally accomplished by bringing the workpiece into rubbing contact with a pad while circulating a slurry of finely divided abrasive particles in an acqueous medium into the area of contact between the pad and the workpiece. The slurry drains from the workpiece surface into a sump from which it is recirculated to further contact with the workpiece by a pump.

Polishing slurries commonly encounter three problems in greater or lesser degree. One problem is the tendency of the solid particles of the slurry to settle rapidly especially when the polishing action is interrupted with the result that the settled material must be redispersed before its use in polishing can be continued. A second problem is that polishing slurries commonly have little capacity to hold the debris removed by the workpiece during polishing action in suspension with the result that the useful life of the polishing slurry is short. A third problem is the tendency of polishing slurries to foam during the course of use with the result that recirculation by a pump is inefficient and even impossible in serious foaming situations.

It is the object of this invention to provide a polishing slurry which is stable, has a long useful life and is essentially foam free during recirculation in a normal polishing operation.

DESCRIPTION OF THE INVENTION

The slurries of the present invention comprise four components.

The first and major component is water which constitutes 80 to 90 percent by weight of the total composition.

The second component is xanthan gum. Xanthan gums are high molecular weight (ca.1,000,000) polysaccharide gums produced by fermenting hexoses with the organism xanthanonous compestious. The fermentation product gum may be modified by acyletion if desired. A suitable xanthan gum is sold by Kelco Company under the name of Keltrol. The quantity of xanthan gum contained in the composition is small being in range 0.02 to 0.25 percent by weight based on the water content of the composition. The xanthan gum functions as a suspending agent and to a small degree because of its low concentration as a viscosity increasing agent.

The third component of the composition is a dispersing agent. While a large number of dispersing agents are known, only two have been found which in combination with the xanthan gum component of the composition are effective to produce a stable slurry having a large capacity to hold debris removed from the workpiece in suspension. One of the dispersing agents is the condensate of naphthalene monosulfonic acid with formaldehyde. The chemical character of the condensate is shown by the following structural formula:

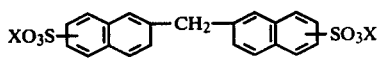

X is hydrogen, ammonium or alkali metal

The second dispersing agent found effective for use in the composition is polymethacrylic acid. Polymethacrylic acids having molecular weights in the range 8,000 to 18,000 and preferably in the range 10,000 to 16,000 are effective.

The dispersing agent is present in the composition in amounts ranging from 0.2 to 1.2 percent by weight.

The two dispersing agents may be used in the acid form or in the form of their ammonium and alkali metal salts, the salt forms being preferred.

The fourth component of the slurry is a finely divided abrasive which is preferably alumina ceria, or zirconia. The abrasive particles are small being in the range 0.05 to 15 micron in diameter. The particle size of the abrasive should be selected with a view to the character of the material to be polished. For polishing plastic lenses it is preferred to use abrasive particles ranging in size from 0.05 to 1 micron. For polishing glass lenses it is preferred to use abrasive particles ranging from 1 to 2 micron in size and for polishing semiconductor wafers it is preferred to use abrasive particles about 7 micron in diameter. The abrasive particles are present in the polishing compositions in amounts ranging from 10 to 20 percent by weight of the total composition.

Two practical considerations relating to the use of the polishing slurries make it desirable in many instances to supply the user with a concentrated solution of the xanthan gum and the dispersing agent in water and permit him to disperse abrasive particles of the size appropriate for the intended use in the concentrate diluted with water all within several days of the time of intended use. While the slurries are very stable, the particles do settle out after about 7 days standing and it must be redispersed before the slurry is used. Also, since the particle size of the abrasive material is varied as indicated above depending on the character of the material to be polished supplying the user with a concentrated solution of the xanthan gum and dispersing agent in water permits the user to dilute the concentrate and disperse abrasive particles of the appropriate size in the diluted concentrate just prior to use. A suitable concentrate consists of water containing from about 0.06 to 0.75 percent by weight of xanthan gum and from 0.5 to 5.0 percent by weight of the dispersing agent. One part of this concentrate is mixed with about 2 parts by volume of water and then the abrasive particles of appropriate size are added in amounts ranging from 10 to 20 percent by weight of the diluted concentrate and dispersed in it.

The following examples are illustrative of an appropriate concentrate and a polishing slurry prepared from it.

EXAMPLE I

A solution for use in suspending finely divided ceria or alumina, or zirconia to produce a slurry for polishing lenses and semiconductor wafers was prepared. The solution consisted of:

| | |
|---|---|
| Water | 10 Liters |
| Xanthan Gum | 30 Grams |
| Dispersing Agent | 300 Grams |

The dispersing agent was the sodium salt of condensate of formaldehyde with naphthalene monosulfonic acid having the structure:

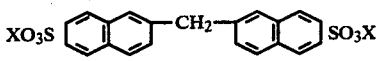

X is hydrogen.

A functionally equivalent solution is obtained by employing polymethacrylic acid having a molecular weight in the range about 8,000 to 18,000 or the ammonium or alkali metal salts of the polyacid as the dispersing agent.

EXAMPLE II

A slurry for use in polishing plastic lenses was prepared. The slurry consisted of:

| | |
|---|---|
| Water | 15 Liters |
| Xanthan Gum | 15 Grams |
| Dispersing Agent | 150 Grams |
| Alumina particles 0.05 to 1 micron | 2700 Grams |

—15 Liters

The dispersing agent was the same as the dispersing agent of Example I. The slurry was prepared by dissolving the xanthan gum and dispersing agent in water and then adding the alumina particles while vigorously agitating the solution. The resultant slurry was very stable, the alumina settled slowly over a period of about 7 days but was readily redispersed by agitation.

During use of the slurry in polishing plastic lenses the debris produced during the polishing remained in suspension and the effective polishing life of the slurry was approximately eight hours. The slurry remained essentially foam free during the polishing operation. A slurry of identical composition is obtained by adding two volumes of water to one volume of the solution of Example I and then dispersing 2700 grams of alumina particles in the resultant mixture.

I claim:

1. A solution for use in suspending 0.05–15.0 micron abrasive particles to produce a slurry for use in polishing lenses and semi-conductor wafers comprising water containing in solution from 0.06 to 0.75 percent by weight of xanthan gum and from 0.5 to 5.0 percent by weight of a dispersing agent selected from the group consisting of the condensate of formaldehyde with naphthalene monosulfonic acid, polymethacrylic acid and their ammonium and alkali metal salts.

2. The solution of claim 1 where in the dispersing agent has the formula:

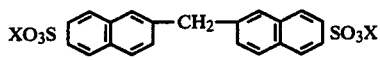

X is hydrogen, ammonium or alkali metal.

3. The solution of claim 1 wherein the dispersing agent is polymethacrylic acid of 10,000 to 16,000 molecular weight or the ammonium or alkali metal salts of said acid.

4. A slurry for use in polishing lenses and semiconductor wafers consisting essentially of (a) one part by volume of the solution of claim 1, 2 or 3, (b) about two parts by volume of water and (c) 10 to 20 percent by weight based on the combined weights of (a) and (b) of 0.05–15 micron particles of ceria, alumina or zirconia.